(12) United States Patent
Timmins

(10) Patent No.: US 12,097,432 B2
(45) Date of Patent: Sep. 24, 2024

(54) MARKUP FREE LEDGE GRAB

(71) Applicant: Bungie, Inc., Bellevue, WA (US)

(72) Inventor: Luke Timmins, Bellevue, WA (US)

(73) Assignee: Bungie, Inc. an independent subsidiary of Sony Interactive Entertainment, Bellevue, WA (US)

( * ) Notice: Subject to any disclaimer, the term of this patent is extended or adjusted under 35 U.S.C. 154(b) by 0 days.

(21) Appl. No.: 18/281,280

(22) PCT Filed: Mar. 10, 2022

(86) PCT No.: PCT/US2022/019682
§ 371 (c)(1),
(2) Date: Sep. 8, 2023

(87) PCT Pub. No.: WO2022/192493
PCT Pub. Date: Jun. 18, 2022

(65) Prior Publication Data
US 2024/0042322 A1 Feb. 8, 2024

Related U.S. Application Data

(60) Provisional application No. 63/158,959, filed on Mar. 10, 2021.

(51) Int. Cl.
*A63F 13/577* (2014.01)
*A63F 13/56* (2014.01)
*A63F 13/63* (2014.01)

(52) U.S. Cl.
CPC ............ *A63F 13/577* (2014.09); *A63F 13/56* (2014.09); *A63F 13/63* (2014.09)

(58) Field of Classification Search
CPC ........ A63F 13/56; A63F 13/577; A63F 13/63; A63F 13/55; A63F 13/57; A63F 13/573; A63F 13/58; A63F 13/60; A63F 13/65
See application file for complete search history.

(56) References Cited

U.S. PATENT DOCUMENTS 6,582,299 B1 6/2003 Matsuyama et al.
6,626,759 B1 * 9/2003 Matsuoka ............... A63F 13/42
463/31

(Continued)

FOREIGN PATENT DOCUMENTS

AE P6002246/2023 9/2023
AE P6002251/2023 9/2023

(Continued)

OTHER PUBLICATIONS

Machine translation of Korean patent publicationi KR 10-2017-0001539 A, Redduck, Inc., published Jan. 4, 2017.*

(Continued)

*Primary Examiner* — David L Lewis
*Assistant Examiner* — Matthew D Hoel
(74) *Attorney, Agent, or Firm* — Polsinelli LLP

(57) ABSTRACT

Described herein are techniques for performing dynamic ledge detection on obstacles within a virtual space. Such techniques may comprise identifying at least one obstacle positioned in proximity to an avatar within a virtual space, identifying at least one facing on the obstacle that is substantially normal to a vector of travel associated with the avatar, identifying, on the at least one facing, a recession that comprises a lip and a receded area above the lip, determining, based at least in part on one or more properties of the receded area, that the recession is a ledge, and generating, at the lip, an anchor point configured to enable one or more interactions between the avatar and the recession.

20 Claims, 9 Drawing Sheets

(56) References Cited

U.S. PATENT DOCUMENTS

| | | | |
|---|---|---|---|
| 8,979,652 B1* | 3/2015 | Ciszewski | A63F 13/577 463/32 |
| 9,004,997 B1 | 4/2015 | Prosin et al. | |
| 9,238,175 B2* | 1/2016 | Ciszewski | G06T 19/20 |
| 9,764,226 B2 | 9/2017 | Prosin et al. | |
| 10,388,053 B1* | 8/2019 | Carter, Jr. | G06T 13/80 |
| 10,994,205 B2* | 5/2021 | Takafuji | A63F 13/577 |
| 11,511,191 B2* | 11/2022 | Zhuang | A63F 13/573 |
| 11,596,866 B1* | 3/2023 | McCain | A63F 13/56 |
| 11,794,107 B2* | 10/2023 | Kutcher | A63F 13/577 |
| 2003/0032478 A1 | 2/2003 | Takahama et al. | |
| 2007/0270215 A1 | 11/2007 | Miyamoto et al. | |
| 2009/0181736 A1 | 7/2009 | Haigh-Hutchinson et al. | |
| 2010/0009733 A1 | 1/2010 | Garvin et al. | |
| 2010/0009734 A1 | 1/2010 | Sambongi et al. | |
| 2011/0165939 A1* | 7/2011 | Borst | A63F 13/63 463/29 |
| 2012/0011464 A1 | 1/2012 | Hayashi et al. | |
| 2012/0322522 A1* | 12/2012 | Ishikawa | A63F 13/577 463/2 |
| 2012/0322523 A1 | 12/2012 | Woodard et al. | |
| 2013/0079140 A1 | 3/2013 | Watkins et al. | |
| 2014/0179430 A1 | 6/2014 | Miyamoto et al. | |
| 2015/0034722 A1 | 2/2015 | Roman et al. | |
| 2015/0157940 A1 | 6/2015 | Hall | |
| 2015/0258439 A1 | 9/2015 | Prosin et al. | |
| 2015/0273333 A1* | 10/2015 | Ciszewski | A63F 13/47 463/31 |
| 2015/0356781 A1* | 12/2015 | Miller | G06T 15/10 345/633 |
| 2018/0264364 A1* | 9/2018 | Zou | A63F 13/822 |
| 2019/0381403 A1 | 12/2019 | Lin et al. | |
| 2020/0038756 A1* | 2/2020 | Takafuji | A63F 13/60 |
| 2020/0094135 A1 | 4/2020 | Miao | |
| 2020/0122025 A1 | 4/2020 | Tsuchiya et al. | |
| 2020/0376383 A1 | 12/2020 | Guimaraes et al. | |
| 2022/0137800 A1 | 5/2022 | Long et al. | |
| 2022/0193550 A1* | 6/2022 | Wang | A63F 13/577 |
| 2022/0203237 A1* | 6/2022 | Kutcher | A63F 13/56 |
| 2022/0266144 A1* | 8/2022 | Zhuang | A63F 13/577 |
| 2023/0099016 A1* | 3/2023 | McCain | G06T 19/006 463/31 |
| 2023/0241496 A1* | 8/2023 | Vaught | A63F 13/63 463/42 |
| 2023/0249076 A1* | 8/2023 | Lin | A63F 13/577 463/31 |
| 2023/0277941 A1* | 9/2023 | Fukada | A63F 13/63 463/31 |
| 2024/0149155 A1 | 5/2024 | Peng | |

FOREIGN PATENT DOCUMENTS

| | | |
|---|---|---|
| AU | 2022232621 | 8/2023 |
| AU | 2022234397 | 9/2023 |
| CA | 3212973 | 9/2023 |
| CA | 3212975 | 9/2023 |
| CN | 110975289 | 4/2020 |
| CN | 111068324 | 4/2020 |
| CN | 111714891 A | 9/2020 |
| CN | 111773724 A | 10/2020 |
| CN | 112306351 | 2/2021 |
| CN | 202280020245.3 | 9/2023 |
| CN | 202280020327.8 | 9/2023 |
| CN | 116963810 | 10/2023 |
| CN | 116964551 | 10/2023 |
| EP | 22767959.4 | 9/2023 |
| EP | 22767961.0 | 9/2023 |
| EP | 4284527 A | 12/2023 |
| EP | 4288861 A | 12/2023 |
| IL | 305744 | 9/2023 |
| IL | 305745 | 9/2023 |
| IL | 305744 A | 11/2023 |
| IL | 305745 A | 11/2023 |
| JP | 2020039947 A | 3/2020 |
| JP | 2023-550046 | 8/2023 |
| JP | 2023-551983 | 8/2023 |
| JP | 2024-509788 | 3/2024 |
| JP | 2024-512246 | 3/2024 |
| KR | 10-2013-0027621 | 3/2013 |
| KR | 10-2015-0095999 | 8/2015 |
| KR | 10-2015-0116299 | 10/2015 |
| KR | 10-2017-0001539 | 1/2017 |
| KR | 1020180119002 A | 11/2018 |
| MX | MX/a/2023/010554 | 9/2023 |
| MX | MX/a/2023/010555 | 9/2023 |
| NZ | 803265 | 8/2023 |
| NZ | 803479 | 9/2023 |
| RU | 2023124998 | 9/2023 |
| RU | 2023124999 | 9/2023 |
| SA | 523450615 | 9/2023 |
| SA | 523450619 | 9/2023 |
| WO | PCT/US2022/019682 | 3/2022 |
| WO | PCT/US2022/019685 | 3/2022 |
| WO | WO 2022/192493 | 9/2022 |
| WO | WO 2022/192495 | 9/2022 |

OTHER PUBLICATIONS

Machine translation of Korean patent publication KR 10-2013-0027621 A, Kim, published Mar. 18, 2013.*

International Patent Application No. PCT/US2022/019682, International Search Report and Written Opinion mailed Jun. 10, 2022, 8 pages.

PCT Application No. PCT/US2022/019682, International Preliminary Report on Patentability mailed Sep. 12, 2023, 4 pages.

PCT Application No. PCT/US2022/019685, International Search Report and Written Opinion mailed Jun. 21, 2022, 9 pages.

PCT Application No. PCT/US2022/019685, International Preliminary Report on Patentability mailed Sep. 12, 2023, 4 pages.

New Zealand Application No. 803265, Examination Report dated Sep. 20, 2023.

Japanese Application No. 2023-551983, Office Action dated Feb. 20, 2024.

Japanese Application No. 2023-550046, Office Action dated Feb. 20, 2024.

Canadian Application No. 3212973, Examiner's Report dated Oct. 4, 2023.

Canadian Application No. 3212975, Examiner's Report dated Dec. 27, 2023.

Australian Application No. 2022232621, Examination Report No. 1 dated Oct. 24, 2023.

Australian Application No. 2022234397, Examination Report No. 1 dated Oct. 13, 2023.

U.S. Appl. No. 18/281,281, Gregory Peng, Virtual Automatic Aiming, filed Sep. 8, 2023.

U.S. Appl. No. 18/281,281, Non-Final Office Action dated May 9, 2024.

Chinese Application No. 202280020245.3, First Office Action dated Mar. 8, 2024.

Australian Application No. 2022232621, Examination Report No. 2 dated May 20, 2024.

Australian Application No. 2022234397, Examination Report No. 2 dated May 15, 2024.

Canadian Application No. 3212975, Examiner's Report dated Jun. 5, 2024.

Mexican Application No. MX/a/2023/010554, Office Action dated Apr. 9, 2024.

Mexican Application No. MX/a/2023/010555, Office Action dated Apr. 9, 2024.

Canadian Application No. 3212973, Examiner's Report dated Apr. 29, 2024.

Israeli Application No. 305745, Office Action dated Mar. 5, 2024.

* cited by examiner

MARKUP FREE LEDGE GRAB

BACKGROUND

Gaming is a popular pastime for a large portion of the population. As gaming continues to grow in popularity, game developers continue to look to new ways to make games interesting and entertaining. One relatively recent practice by such game developers is to allow players to design their own levels (e.g., via a map editor, etc.). While this allows players to experience a variety of content that has been created by other players, the content creators are often inexperienced in level design and may not properly vet their content. Because of this, content that has been created by independent content creators can lead to problems that might be attributed to the underlying game.

SUMMARY

Techniques are provided herein for detecting and marking ledges for use by an avatar. The techniques enable dynamic detection and marking of ledges within a game map while the map is being played. Such techniques may result in error reduction (especially when user-generated maps are implemented) as well as greater customization of avatar abilities.

In one embodiment, a method is disclosed as being performed by a user device, the method comprising identifying at least one obstacle positioned in proximity to an avatar within a virtual space, identifying at least one facing on the obstacle that is substantially normal to a vector of travel associated with the avatar, identifying, on the at least one facing, a recession that comprises a lip and a receded area above the lip, determining, based at least in part on one or more properties of the receded area, that the recession is a ledge, and generating, at the lip, an anchor point configured to enable one or more interactions between the avatar and the recession.

An embodiment is directed to a computing system comprising a touch-screen display, a processor; and a memory including instructions that, when executed with the processor, cause the computing device to, at least identify at least one obstacle positioned in proximity to an avatar within a virtual space, identify at least one facing on the obstacle that is substantially normal to a vector of travel associated with the avatar, identify, on the at least one facing, a recession that comprises a lip and a receded area above the lip, determine, based at least in part on one or more properties of the receded area, that the recession is a ledge, and generate, at the lip, an anchor point configured to enable one or more interactions between the avatar and the recession.

An embodiment is directed to a non-transitory computer-readable media collectively storing computer-executable instructions that upon execution cause one or more computing devices to collectively perform acts comprising identifying at least one obstacle positioned in proximity to an avatar within a virtual space, identifying at least one facing on the obstacle that is substantially normal to a vector of travel associated with the avatar, identifying, on the at least one facing, a recession that comprises a lip and a receded area above the lip, determining, based at least in part on one or more properties of the receded area, that the recession is a ledge, and generating, at the lip, an anchor point configured to enable one or more interactions between the avatar and the recession.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
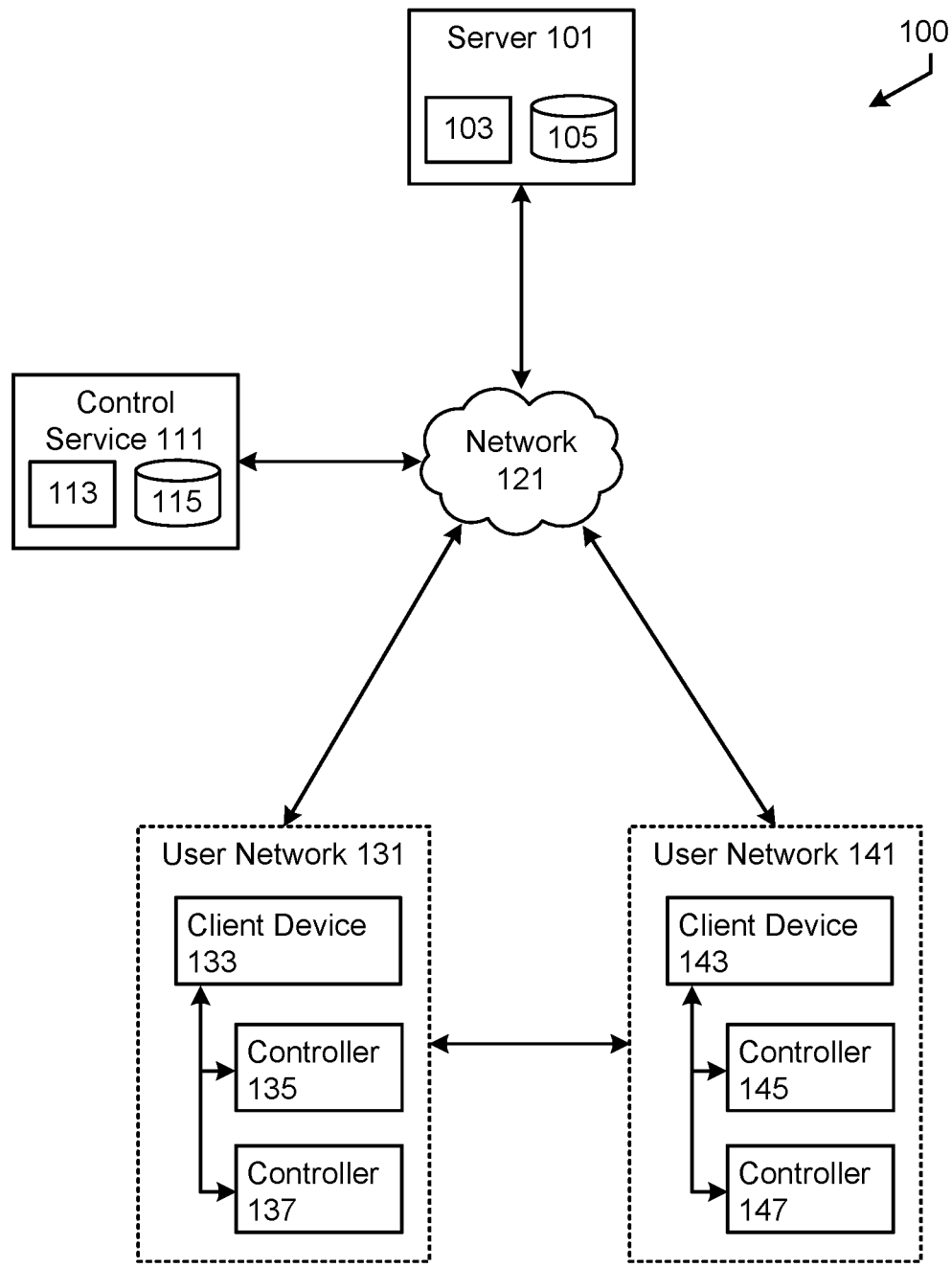
FIG. 1 is a simplified system diagram illustrating a service environment in which a virtual controller can be used, in accordance with various embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to methods and systems for detecting geometric structures within content. Particularly, the methods and systems described herein are directed toward detecting and/or classifying "ledges"—orthogonal pieces of level geometry that a 3*d* avatar can interact with (e.g., attach to and prevent falling). These methods allow "ledge" detection without explicit content markup of what constitutes a ledge—in other words, permitting content creators to place arbitrary 3d geometry in a game level with the knowledge that the system will detect what geometry the 3d avatar can hold on to without the special markup required on most if not all extant gaming platforms. These methods also include ledge detection and methods of detecting a player's intent of wanting to attach to a ledge.

Embodiments of the disclosure provide for a number of advantages over conventional systems. One common problem in games that have 3D avatars (under the influence of gravity) who want to jump across pits or on elevated platforms is that it's easy to "miss jumps". The player may jump too early, or not jump high enough, resulting in a frustrating experience where the player just barely doesn't jump on top of a platform, but instead clips a wall with their feet—sliding down to their doom.

To solve this problem, many games implement a "ledge system" that allows a player's avatar to "hang" or "attach" to a ledge if they "miss" a jump. What's challenging for content creators when making levels is they often want to rapidly experiment with different level geometry (platform heights, pits, wall angles) to enable an enjoyable platforming experience for running around and jumping with avatars of varying heights and abilities (run speeds, jump height, etc). While a human can easily say "this intersection of geometry is a ledge that an avatar should hold on to", having an algorithm that can recognize arbitrary 3d geometry and know when it's safe for an avatar to attach to it is nontrivial. Most games solve this by forcing a content creator to "markup" geometry that is intended to be grabbed by an avatar. But this is time consuming, and any change to level geometry can invalidate the mark-up (ex. moving a cube can cover up a region that what was flagged as being a "ledge"). A solution that works with no markup is preferred. In addition, players want control over when their avatar "grabs" to a ledge.

Embodiments of the disclosure provide for dynamic detection of ledges on obstacles in a virtual space. In other words, the disclosure is directed to a system that is capable of identifying ledges on various objects/obstacles that can be interacted with by an avatar without requiring that the ledges be marked up beforehand. Such a system is advantageous over systems that require markup in that even relatively novice users can participate in level generation. Additionally, by dynamically detecting and marking ledges, the system is able to customize the gaming experience. For example, attributes of each avatar may be used to identify and mark ledges, such that different ledges may be dynamically mapped for each avatar. In this example, shallower recessions may be identified for smaller avatars whereas higher recessions may be identified for taller avatars. In this way, the system provides much more customization of gameplay than a conventional system, even for two different people playing the same map.

FIG. 1 is a simplified system diagram illustrating a service environment 100 in which a virtual controller can be used, in accordance with various embodiments of the present disclosure. The service environment 100 includes at least one server 101, which includes at least one processor 103 and non-transitory memory 105 storing as software instructions to facilitate operation of the service environment. The server 101 is connected via a network 121 (e.g., the Internet or a local network), with any suitable number of user-owned client devices 133, 143, which typically operate in conjunction with respective local user networks 131, 141 (e.g., consumer or commercial local area networks, WIFI networks, etc.)

The server 101 can also connect to any suitable number of control services 111, e.g., network-connected computing systems with their own processors 113 and memory 115 that monitor network to and from the server 101 and client devices 133, 143. In some embodiments, the server 101 can be one or more servers operating at commercial scale, e.g., a datacenter or server farm. Client devices 133, 143 can include, but are not limited to, consumer personal computers, video game consoles, thin-client devices operable to stream video content from the server 101 for presentation on a local screen, or mobile devices such as smartphones, tablets, or the like. Client devices 133, 143 can connect to any suitable number of controllers, e.g., controller 135, 137, 145, 147.

Each controller (e.g., controller 135) can be hardware devices (e.g., console-specific controllers, cross-compatible controllers, or virtual controllers) with connectivity hardware and protocols for communicating with their respective client device 133. According to some embodiments, controller 135 can be a virtualized controller operating on a thin-client device or touch-screen device, e.g., a controller simulated on a touchscreen smartphone, tablet, or console-like controller with a touch-enabled panel. According to some further embodiments, e.g., where the client device 133 is a thin-client device or mobile device, controller 135 can be a touchscreen with virtualized controls that is built-in to the client device. Alternatively, even where the client device 133 is a thin-client device, controller 135 can be a hardware controller configured to physically or wirelessly connect with the client device. According to some embodiments, the client device 133 and server 101 can operate on the same hardware, e.g., the client device running as a virtual instance on the server.

The methods described herein can be implemented on client devices in conjunction with a service environment such as service environment 100 described in FIG. 1. The methods can further work in the context of arbitrary placement of the virtual controller, which controls both avatar facing and movement, on-screen.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

FIG. 2 depicts an illustrative example of an environment 200 in which ledge detection may be implemented in accordance with embodiments. Illustrative examples of detectable and undetectable ledges are shown in FIGS. 2A-2F.

Figure 2A:
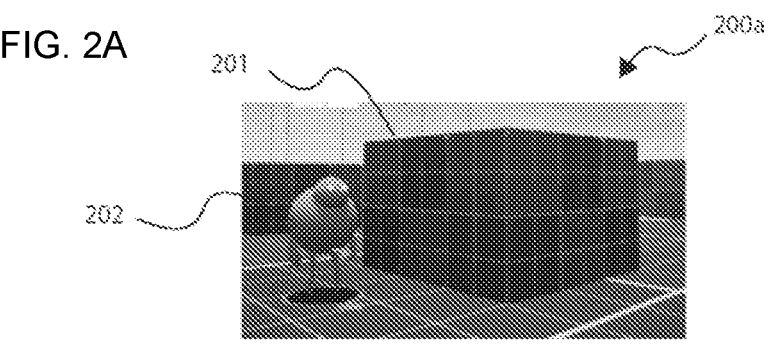
FIG. 2A shows a simple case, in which a ledge runs around the top of a cube that is larger than the avatar.

FIG. 2A shows a simple case 200*a*, in which a ledge 201 runs around the top of a cube that is larger than the avatar 202. The cube has a flat top and vertical walls.

Figure 2B:
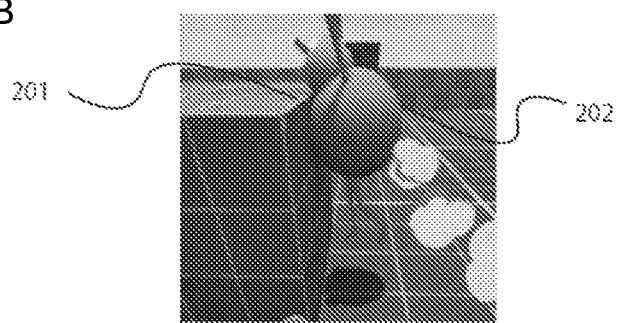
FIG. 2B shows a simple edge detection case in accordance with at least some embodiments.

FIG. 2B shows a simple edge detection case in accordance with at least some embodiments. In this example, the cube has a flat top, making if potentially climbable by the avatar 202. Accordingly, each of the sides of the cube would be determined to be a ledge in this example.

Figure 2C:
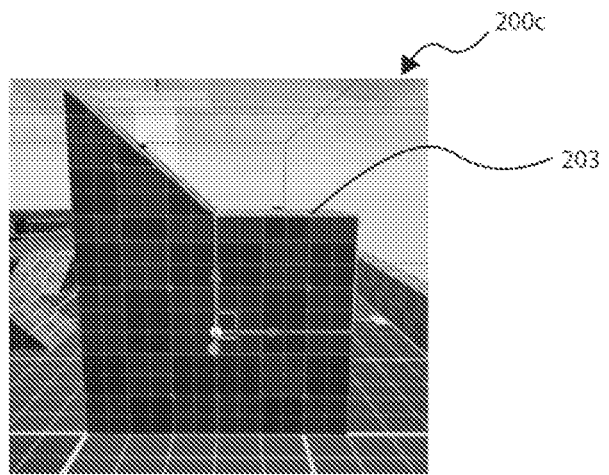
FIG. 2C shows a more complicated structure in which edge detection is possible within certain regions in accordance with some embodiments.

FIG. 2C shows a more complicated structure in which edge detection is possible within certain regions in accordance with some embodiments. In FIG. 2C, the edge detection is possible within a region 203. As depicted, the top of the structure may be flat within the region 203, allowing for an edge to be detected within that region.

Figure 2D:
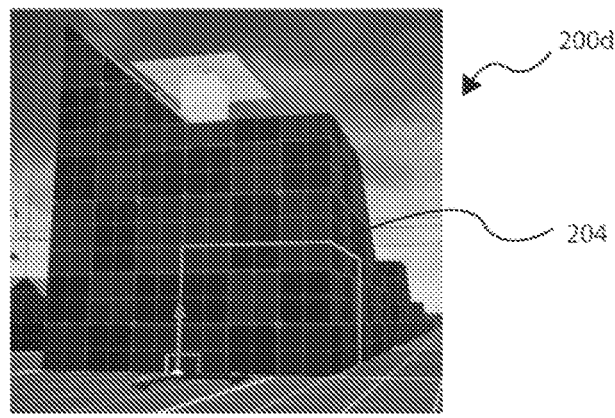
FIG. 2D focuses on other areas of the more complicated structure in accordance with some embodiments.

FIG. 2D focuses on other areas of the more complicated structure in accordance with some embodiments. As shown in FIG. 2D, portions of the structure without a ledge (e.g. 204) are not detectable as ledges.

Figure 2E:
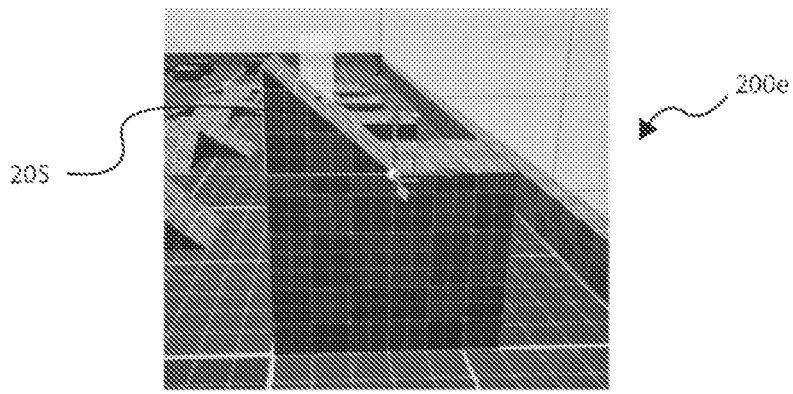
FIG. 2E focuses on a first set of areas of the more complicated structure in which ledges are not detected in accordance with some embodiments.

FIG. 2E focuses on a first set of areas of the more complicated structure in which ledges are not detected in accordance with some embodiments. As shown in FIG. 2E, portions of the structure that have too steep an angle of the vertical surface (e.g., 205) are not detectable as ledges.

Figure 2F:
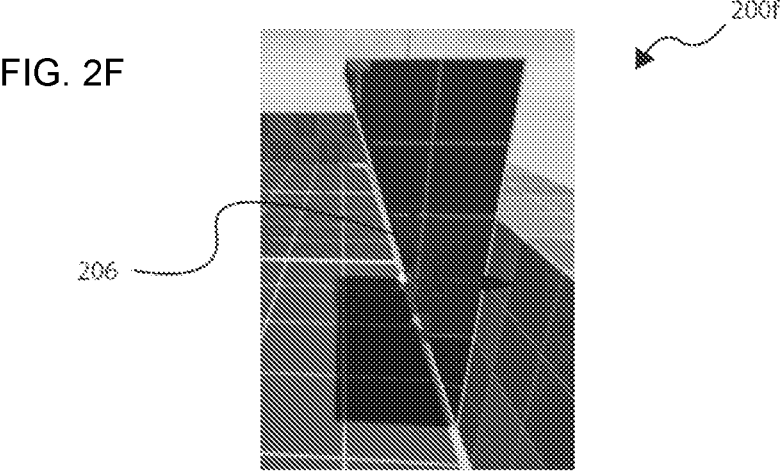
FIG. 2F focuses on a second set of areas of the more complicated structure in which ledges are not detected in accordance with some embodiments.

FIG. 2E focuses on a second set of areas of the more complicated structure in which ledges are not detected in accordance with some embodiments. As shown in FIG. 2F, portions of the structure where the horizontal face angle is too great (e.g., 206) are not detectable as ledges.

A process for ledge detection may start by looking at the player's input vector (instead of the facing vector of the player's avatar). This allows the system to determine player intent (ex. "is the player using their controller to point in a direction of a possible ledge?") rather than just the result of past actions. Next, the system looks at the velocity of the player's avatar, and determines if its upward velocity is smaller than some threshold (ex. "is the player's avatar at or past the apex of their jump?").

The system may then do a collision check (e.g., a spherical collision test) starting at the player's avatar location and ending at a specified distance in the direction of the player's input ("is there anything solid between the avatar and the direction the player wants to move"). If the system identifies something ("a wall"), the system looks at the location of the collision point and tests the angle between the input vector and the vector from the avatar to the wall impact location ("only look for walls that are in the direction of the input vector, not walls that may be orthogonal to the avatar's location"). Next the system may test the angle of the wall impact normal for a tolerance ("is this wall face too steep to be considered a wall?"). If the discovered wall passes those tests, the system may run a second swept sphere collision check, this time offsetting both the starting position of the collision check (initially the player's avatar position) and the disconcerted wall collision point, downward by a small amount. This second collision check ensures the wall face is large enough for the system to consider it a wall. The system may run the same fall face tests as before against this new wall position.

If the second collision check and fall face tests are passed, the system may run a final collision test (e.g. swept sphere) starting from an elevated point above our initial wall collision point and moving downward. This allows the system to find the "top" of the ledge. The system may test the normal of the impact position to see if the elevation is too steep to be grabbed on to. If all those test pass, the system may build an "anchor point" for our 3d avatar to "attach" to the wall. This point is customized based on the 3d size of the avatar. As a final test the system may do a ray test from the anchor point to the floor to make sure there is a sufficient distance as the system may want to prevent "short ledges" from being grabbed on to. Advantageously, these methods allow the system to handle a level composed of arbitrary 3d objects (cubes, ramps, walls, etc.) at arbitrary orientations, and detect ledges a player may want to grab on to with their avatar.

Figure 3:
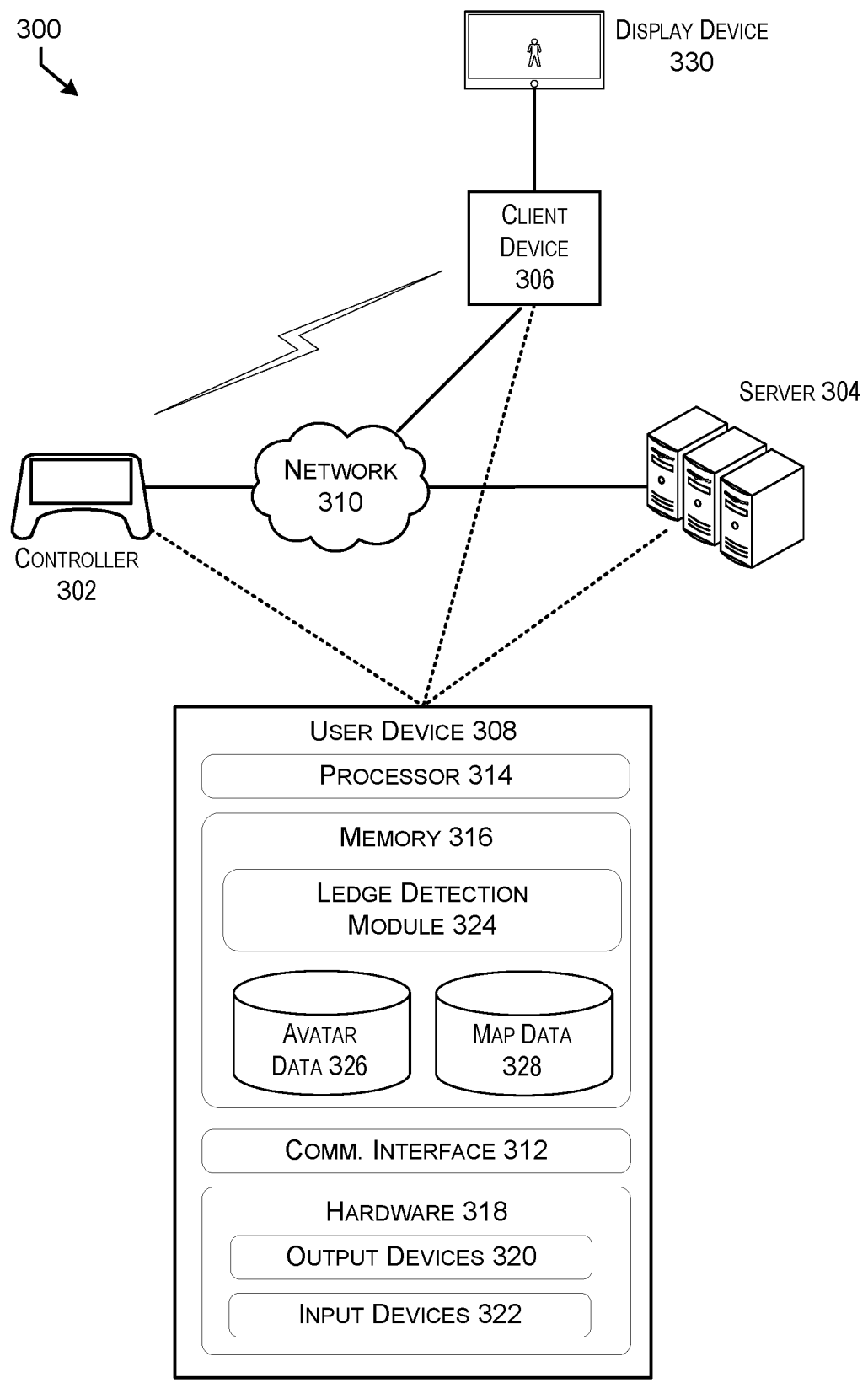
FIG. 3 is a block diagram showing various components of a computing system architecture that supports implementation of mark-up free ledge identification in accordance with embodiments.

FIG. 3 is a block diagram showing various components of a computing system architecture that supports implementation of mark-up free ledge identification in accordance with embodiments. The system architecture may include at least one controller 302. In some embodiments, the controller 302 may be in communication with one or more server 304, which may be an example of the server 101 as described with respect to FIG. 1. In some embodiments, the one or more server 101 may provide backend support for the controller 302. For example, at least a portion of the processing described as being performed by the controller 302 may instead be performed by the server 101 in some cases. In some embodiments, the controller 302 may be in communication with a client device 306. The client device 306 may be an example of client device 133 or 143 as described in relation to FIG. 1 above. In some embodiments, the client device 306 may be in further communication with a display 330. Each of the components described herein may be in communication via a connection over a network 310.

The controller 302 may include any suitable computing device configured to perform at least a portion of the operations described herein and configured to enable a user to interact with a software application. In some embodiments, the controller may be a mobile device (e.g., a smartphone or tablet) having touchscreen capabilities.

The server 304 can include any computing device configured to perform at least a portion of the operations attributed to it. The server 304 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 304 can include one or more virtual machines running virtual operating systems, or other computing architectures involving virtualization such as one or more flexible pools of logical storage devices that can be virtualized to maintain virtual storage devices for the computer. For example, the server 304 may include virtual computing devices in the form of virtual machines or software containers that are hosted in a cloud.

The client device 306 may include any suitable computing device configured to receive input from the controller 302 and perform an action based on that input. In some embodiments, the client device may be a gaming system, such as a gaming console that may receive input from a number of controllers, each of which may be used to control an avatar or character within a software application (e.g., a computer game). It should be noted that in some cases, the client device 306 may also be the controller 302. For example, a mobile phone may act as both the client device and the controller when executing a mobile game.

As noted above, the system architecture is capable of supporting implementation of mark-up free ledge identification using the various techniques described herein. Such techniques may be implemented on any combination of the controller 302, server 304, or client device 306. Accordingly, the techniques will be described as being implemented on a user device 308 herein. One skilled in the art will recognize that such a user device may include one or more of a controller 302, server 304, or client device 306 as depicted.

The user device 308 may include a communication interface 312, one or more processors 314, memory 316, and hardware 318. The communication interface 312 may include wireless and/or wired communication components that enable the controller 302 to transmit data to and receive data from other networked devices. The hardware 318 may include additional user interface, data communication, or data storage hardware. For example, the user interfaces may include at least one output device 320 (e.g., visual display, audio speakers, and/or haptic feedback device), and one or more data input devices 322. The data input devices 322 may include, but are not limited to, combinations of one or more of keypads, keyboards, mouse devices, and/or touch-screens that accept gestures, microphones, voice or speech recognition devices, and any other suitable devices.

The memory 316 may be implemented using computer-readable media, such as computer storage media. Computer-readable media includes, at least, two types of computer-readable media, namely computer storage media and communications media. Computer storage media includes any suitable volatile and non-volatile, removable and non-removable media implemented in any method or technology for storage of information such as computer-readable instructions, data structures, program modules, or other data. Computer storage media includes, but is not limited to, RAM, DRAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The one or more processors 314 and the memory 316 of the controller may implement functionality that includes one or more software modules and data stores. Such software modules may include routines, program instructions, objects, and/or data structures that are executed by the processors 314 to perform particular tasks or implement particular data types. More particularly, the memory 316 may include a module that is configured to identify and/or classify ledges on obstacles in order to facilitate interactions between those obstacles and an avatar (e.g., ledge detection module 324).

Additionally, the memory 316 may include various data stores. For example, the memory 316 may maintain data about one or more attributes of an avatar (e.g., avatar data 326) as well as data about a layout of an area that includes one or more obstacles (e.g., map data 328).

The ledge detection module 324 may be configured to, in conjunction with the processor 314, identify one or more ledges capable of being interacted with by an avatar on obstacles within a game map. In some cases, the game map may be a user-generated map. In some embodiments, this involves detecting potential collisions between an avatar and one or more objects based on a current trajectory and/or an intended trajectory (e.g., as determined based on a received input vector) of the avatar and one or more obstacle positions.

Upon detecting a potential collision between the avatar and an obstacle, the ledge detection module 324 may be configured to dynamically identify and mark one or more ledges that may be interacted with by the avatar on that obstacle. This may first involve determining whether a facing of the obstacle is relatively normal to a vector at which the avatar will collide with that facing. If the facing is relatively normal to the movement of the avatar, then the ledge detection module 324 may be configured to identify one or more recessions in that facing based on identifying portions of the facing that extend backward. Provided that one or more recessions are identified, the ledge detection module 324 may be configured to determine whether a recession is a ledge based on a positioning of the recession as well as an angle of an area above the recession. Upon identifying a ledge, the ledge detection module 324 may be configured to mark that ledge (e.g., via an anchor point) in order to enable the avatar to interact with (e.g., hang from or climb onto) that ledge.

Figure 4:
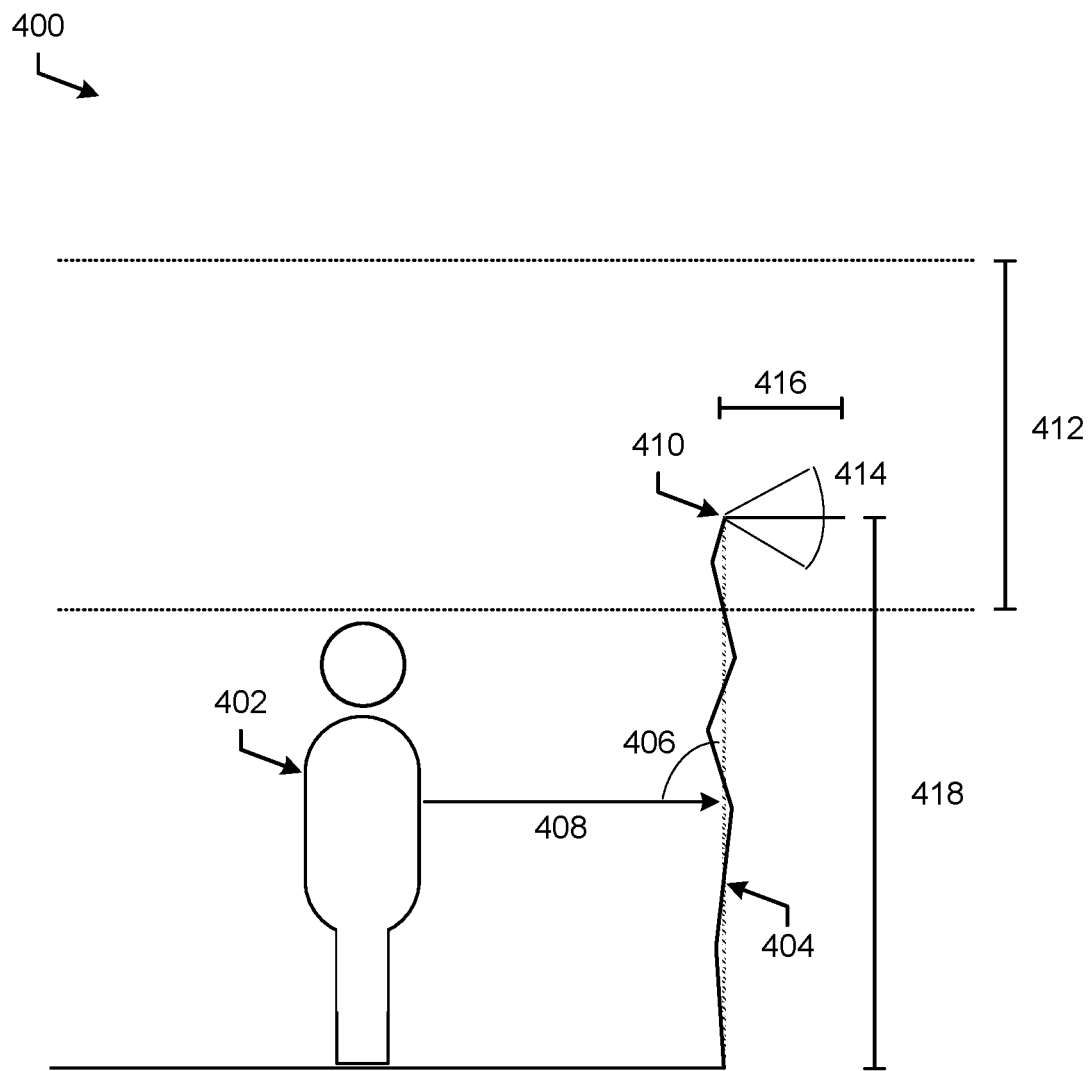
FIG. 4 depicts a graphical illustration of a process for identifying ledges on obstacles in accordance with embodiments.

FIG. 4 depicts a graphical illustration of a process for identifying ledges on obstacles in accordance with embodiments. The process 400 may be performed on a user device upon which a virtual physical controller has been implemented, such as the controller 302 as described with respect to FIG. 3 above.

In the process 400, a determination may be made that a path of travel for an avatar 402 coincides with an obstacle 404. In some cases, the path of travel may be determined based on a vector associated with a current trajectory of the avatar. In some cases, the path of travel may be determined based on an input vector generated in relation to input provided by a user. For example, a user may indicate a speed and direction for the avatar to travel via a directional pad. A region that includes locations along the path of travel may then be compared to a number of obstacles to determine if the obstacles are (at least partially) located within that region. Upon determining that one or more obstacles is at least partially located within the region, an impending collision may be detected with that obstacle. In some embodiments, in order to reduce computational requirements, only obstacles located within a predetermined distance of the avatar may be checked for an impending collision. In some of these embodiments, the predetermined distance may be determined based on a current speed of the avatar. For example, collision checks may be performed for obstacles at a greater distance for an avatar traveling at a higher speed than an avatar traveling at a lower speed.

Upon detecting an impending collision with an obstacle 404, one or more facings of that obstacle may be checked for ledges. In some embodiments, one or more facings of the obstacle may be checked within some predetermined distance of a predicted point of impact between the avatar and the obstacle. In some embodiments, such a check may begin by identifying an angle 406 at which the avatar is likely to impact a plane corresponding to the facing of the obstacle in relation to a vector 408 associated a travel direction for the avatar. In such a check, a determination may be made as to whether the angle is within a predetermined range of angular degree. For example, a determination may be made as to whether the angle 406 is within plus or minus 10 degrees of being normal to the vector 408. In other words, a determination may be made as to whether the angle 406 is between 80 and 100 degrees. In some embodiments, the facing may be uneven and the plane at which the angle 406 may be checked against may correspond to an average verticality of the facing.

Upon making a determination that the angle 406 is within a threshold angular degree, the ledge detection process may proceed by identifying one or more recessions 410 in the facing. A recession may be identified as a lip on the facing above which the facing recedes by a threshold amount (e.g., the facing recedes at or above a predetermined angle). In some embodiments, a portion of the facing may be identified as a recession only if the facing recedes by a predetermined amount of horizontal distance over an amount of distance in a vertical direction. In some embodiments, the amount of horizontal distance that a potential recession needs to recede to be considered a recession may be dependent upon a number of factors. For example, the amount of horizontal distance may be dependent upon a size of the avatar, such that a recession is more likely to be identified for a smaller avatar than for a larger avatar.

In some embodiments, in order to reduce computation needed for example, only a portion of the facing falling within a height range 412 may be checked for recessions. In such cases, the range may include a vertical minimum height, under which the facing is not checked for recessions, as well as a vertical maximum height, above which the facing is not checked for recessions. In some embodiments, one or more values of the height range 412 is dependent upon factors associated with the avatar. For example, a vertical minimum height and/or vertical maximum height for the height range 412 may be dependent upon a height and/or reach value associated with the avatar. In this way, higher up recessions may be identified on a facing for taller avatars as opposed to shorter avatars.

Once one or more recessions have been identified as potential ledges, a determination may be made as to whether the recessions are ledges. In some embodiments, this involves determining whether an angle 414 of an area above the recession in relation to the facing is within a predetermined range. In this example, a recession may be determined to be a ledge if, and only if, the area above the recession lies at an angle between 85 and 95 degrees in relation to the vertical portion of the facing. In some embodiments, a recession may be determined to be a ledge if an area above the recession extends back from the facing of the obstacle by at least a threshold distance 416. In some embodiments, the threshold distance 416 may be dependent upon one or more aspects of the avatar. For example, the threshold distance 416 may be dependent upon a width associated with the avatar. In some embodiments, the area above the ledge may include a volume of space above the ledge, such that obstacles included in the space may impact whether the recession should be considered a ledge. Once a ledge has been identified, an anchor point may be attached to the ledge, such that an avatar is able to interact with the ledge via the anchor point.

In some embodiments, an identified ledge may be classified as a particular type of ledge. In some cases, a height 418 (e.g., a distance of the ledge from a "floor") of the ledge may be used to classify the ledge. For example, if the height of the ledge is above a threshold height value, then the ledge may be classified as a hanging ledge whereas if the height of the ledge is below the threshold height value, then the ledge may be classified as a climbing ledge. In some embodiments, the classification of the ledge may also be dependent upon the threshold distance 416. For example, if the area above the ledge is shorter than the threshold distance 416, then the ledge may be classified as a hanging ledge whereas if the area above the ledge is longer than the threshold distance 416, then the ledge may be classified as a climbing ledge. In embodiments, an avatar's interaction with a ledge may depend upon a classification of the ledge. For example, upon the avatar approaching the ledge, the avatar may be caused to perform a hanging action if the ledge is a hanging ledge or a climbing action if the ledge is a climbing ledge.

Figure 5:
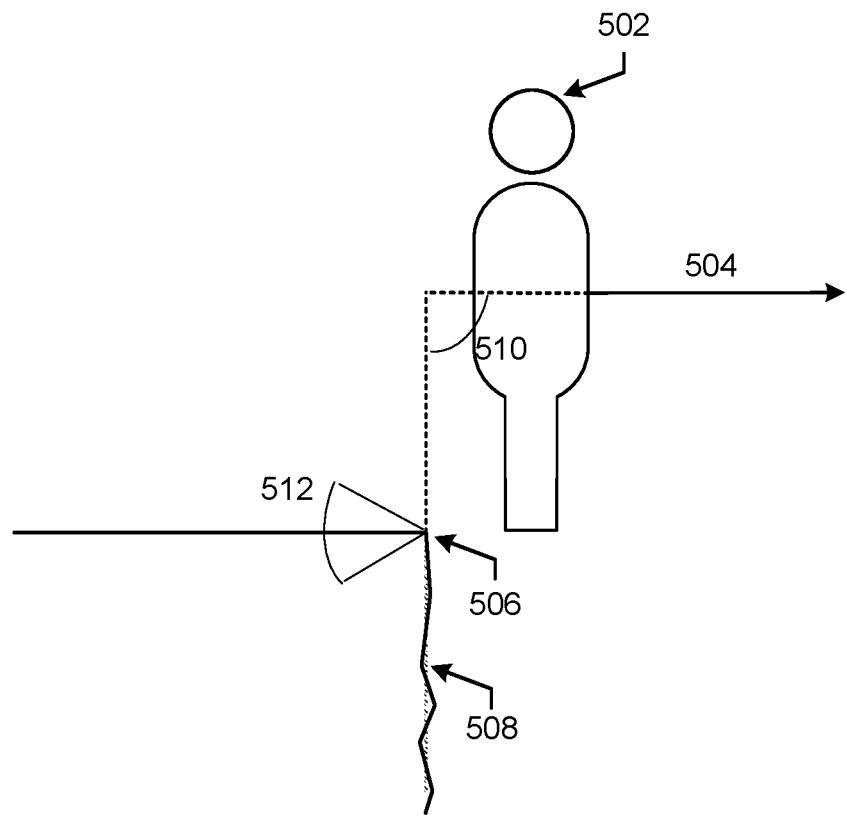
FIG. 5 depicts a graphical illustration of an exemplary ledge that may be identified in accordance with embodiments.

FIG. 5 depicts a graphical illustration of an exemplary ledge that may be identified in accordance with embodiments. Particularly, FIG. 5 depicts a ledge that is an edge that an avatar 502 may fall from.

As depicted, an avatar 502 is associated with a travel vector 504 that indicates a direction that the avatar is currently traveling. In this example, an edge 506 may be detected as an obstacle in proximity to (e.g., within a threshold distance of) the avatar. The edge 506 (i.e., the obstacle) may be associated with at least one facing 508. In some embodiments, the edge may be detected once the avatar has crossed over that edge or when the avatar is predicted to cross over the edge in the near future.

In some embodiments, a determination may be made as to whether an angle 510 between the travel vector 504 and the at least one facing 508 is within some range of angles. For example, a determination may be made as to whether the angle 510 is relatively normal, in that the travel vector is at, or within some predetermined range of, a ninety-degree angle with respect to the plane that represents the at least one facing. In some embodiments, a determination may further be made as to whether an angle 512 is within some threshold range. For example, the edge may be treated as a ledge if a surface above the edge is relatively horizontal (e.g., substantially aligned with a ground plane).

As depicted, the ledge in the case described in this example may be located at the feet of the avatar or below the avatar. Additionally, such a ledge may be located behind the avatar. Upon detecting such a ledge, one or more actions may be made available to the avatar that are unique to such a ledge. For example, upon receiving instructions to interact with an anchor point placed on such a ledge, the avatar may be caused to spin around and grab the ledge as he or she falls.

Figure 6:
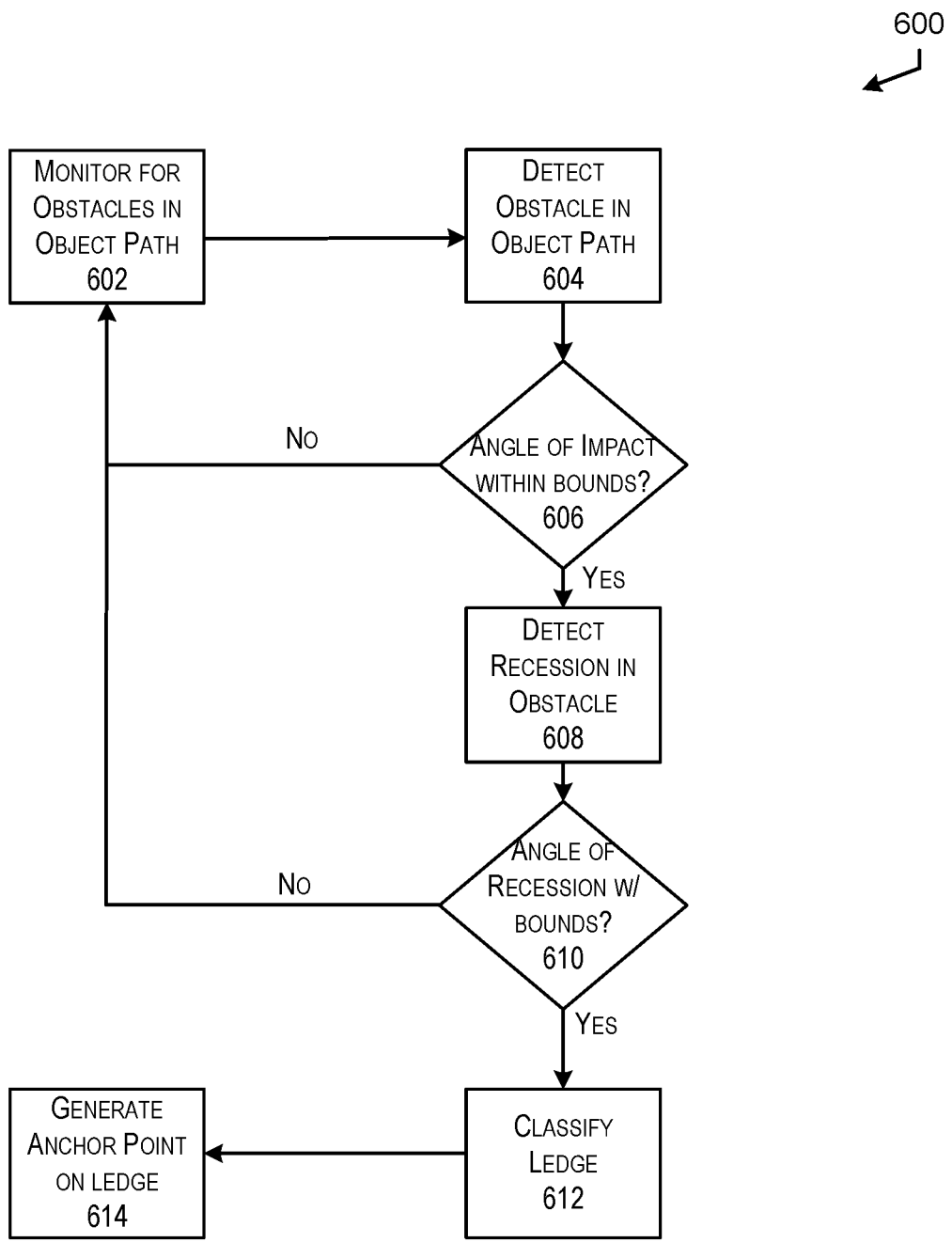
FIG. 6 depicts a block diagram illustrating a process for dynamically detecting and marking ledges on obstacles in accordance with some embodiments.

FIG. 6 depicts a block diagram illustrating a process for dynamically detecting and marking ledges on obstacles in accordance with some embodiments. Some or all of the exemplary process 600 (or any other processes described herein, or variations and/or combinations thereof) may be performed under the control of one or more computer systems configured with executable instructions and may be implemented as code (e.g., executable instructions, one or more computer programs or one or more applications). The process 600 can be performed by any suitable device, including but not limited to user device 308 shown in FIG. 3.

At 602, the process 600 involves monitoring for detected obstacles in the path of an object being controlled (e.g., an avatar). The path of the object may be a vector determined from a current trajectory of the object, received user input, or some combination of the two. In some embodiments, one or more obstacles may be determined to be in a path of the object if the vector associated with the object's path coincides or overlaps with a current position of the object. In some embodiments, each obstacle within a predetermined distance of the object may be checked (e.g., periodically) to determine if it is in the path of the object. If a determination is made that an obstacle is located at a position that coincides with the path, then the obstacle is detected as being within the object path at 604.

At 606, the process involves determining whether an angle of impact of the object and the obstacle is within threshold bounds. Particularly, a determination may be made as to whether the vector of the object's travel is substantially normal to a plane that represents a facing of the obstacle. To be considered relatively normal, the vector of the object's travel should form an angle of 90 degrees to the facing plus or minus a predefined threshold variance. For example, the angle of impact might be considered substantially normal to the facing of the object if the vector of the object's travel will impact the facing at plus or minus 10 degrees (e.g., 80 to 100 degrees) of a right angle. In this example, if the vector of the object's travel is determined to be likely to impact the facing of the obstacle at an angle of 85 degrees, the angle of impact is determined to be substantially normal (i.e., within the threshold bounds). Upon determining that the angle of impact is not within the threshold bounds (e.g., "No" from 606), the process 600 may be repeated for each obstacle determined to be in the path of travel. If no other obstacles have been detected, then the process may return to monitoring for obstacles at 602.

Upon determining that the angle of impact is within the threshold bounds (e.g., "Yes" from 606), the process 600 may involve detecting one or more recessions at 608. In some embodiments, this involves analyzing the geometry of the facing of the obstacle to detect one or more segments of the facing at which the facing recedes. In some embodiments, a recession may only be detected for a portion of the facing that recedes by at least some threshold horizontal distance over a predetermined vertical distance. In embodiments, a recession may include at least a lip that runs along a portion of the facing and a receded area above the lip that recedes at least some predetermined distance in a horizontal direction.

At 610, the process 600 may involve determining whether an angle of an area above the recession is within a threshold bound of an appropriate angle. For example, a determination may be made of an angle of the area being relatively horizontal (i.e., running parallel to the ground). In this example, an appropriate angle might be one that is approximately 90 degrees from the facing (e.g., at the lip of the recession) or within 10 degrees of a plane that runs parallel to a "floor" that represents a ground level for a virtual space. Upon determining that the angle of an area above the recession is not within the threshold bounds (e.g., "No" from 610), the process 600 may be repeated for each recession detected on the obstacle. If no other recessions have been detected, then the process may return to monitoring for obstacles at 602.

Upon determining that the angle of an area above the recession is within the threshold bounds (e.g., "Yes" from 610), the process 600 may proceed to classify the recession as a ledge at 612. In some embodiments, the process may further classify the ledge as being a particular type of ledge. For example, the ledge may be classified as either a climbable ledge or a hangable ledge depending on one or more attributes of the recession. In some embodiments, this may involve calculating an open area above the ledge and determining whether such an area could support an avatar (e.g., based on a width and height of the ledge and avatar). In some cases, this may further involve determining whether any additional obstacles are located above the recession.

Once the recession has been classified as a ledge (and in some cases classified as a particular type of ledge), the process 600 may involve generating an anchor point for the ledge at 614. An anchor point is a marking of a location that the avatar can interact with. Particularly, the anchor point generated for a ledge may enable the avatar to perform ledge-related actions at the anchor point. In some embodiments, a number of such anchor points may be positioned at various intervals along the lip of the recession. Accordingly, as an avatar approaches an anchor point, that anchor point is detected and any actions associated with that anchor point may be performed by the avatar.

It should be noted that the actions performed by the avatar with respect to a particular anchor point may vary based on the avatar. In some embodiments, information used by the process 600 to detect and classify ledges may vary based on attributes of the avatar. For example, bigger avatars may require larger areas above a recession in order for that recession to be classified as a ledge. In this way, not only can ledge detection be performed dynamically as a player is playing, but maps may be made to respond to different avatars differently based on attributes/abilities of those avatars.

Figure 7:
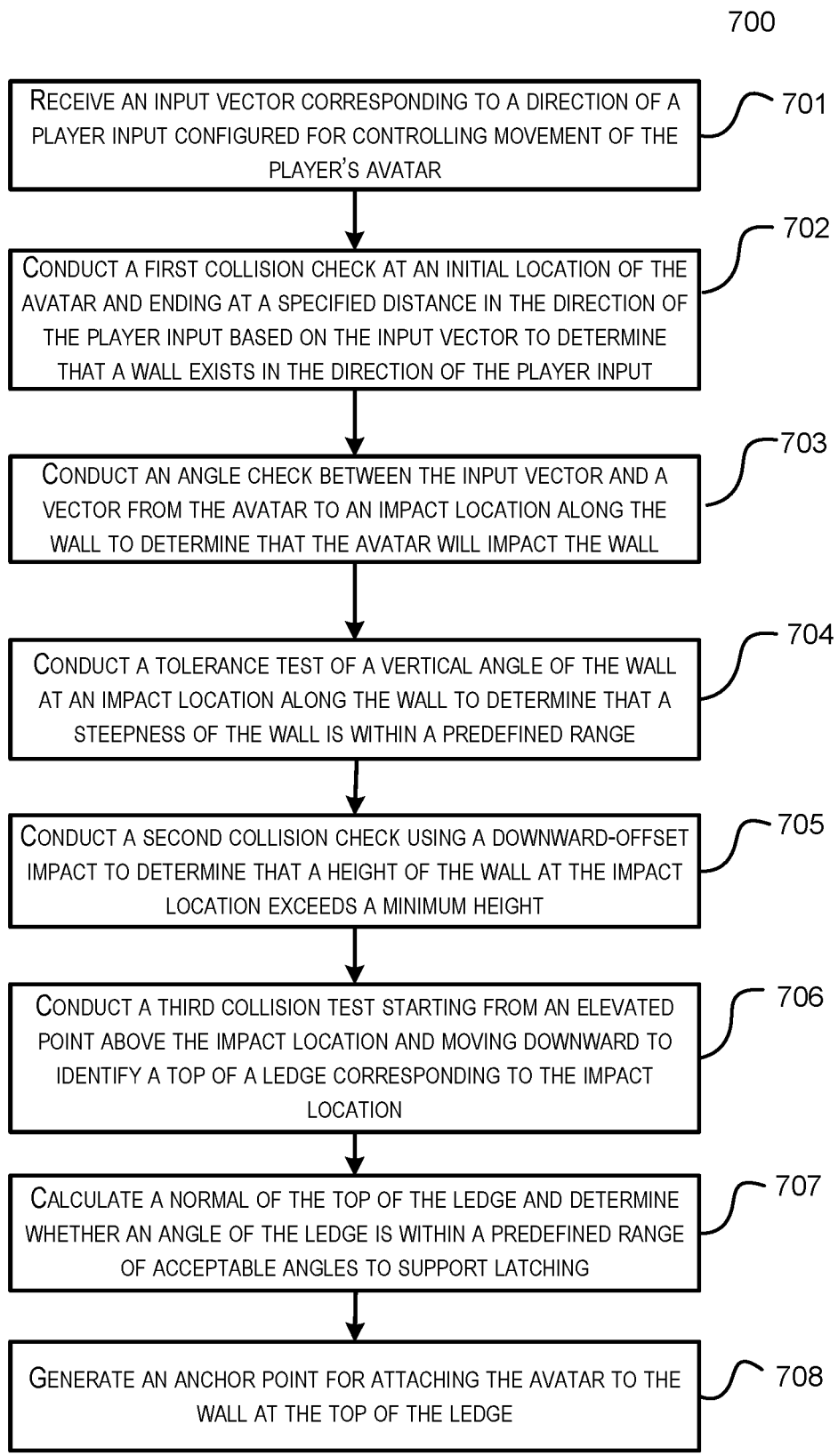
FIG. 7 depicts an example process flow for performing ledge detection in accordance with embodiments.

FIG. 7 depicts an example process flow 700 for performing ledge detection in accordance with embodiments. The process 700 can be performed by any suitable device, including but not limited to user device 308 shown in FIG. 3.

In accordance with various embodiments, process 700 includes receiving, by the game system, an input vector corresponding to a direction of a player input configured for controlling movement of a player's avatar in a virtual space at 701. The system then conducts a first collision check at an initial location of the avatar and ending at a specified distance in the direction of the player input based on the input vector to determine that a wall exists in the direction of the player input at 702. In response to determining that the wall exists in the direction of the player input, an angle check is conducted between the input vector and a vector from the avatar to an impact location along the wall to determine that the avatar will impact the wall at 703. In response to determining that the avatar will impact the wall, a tolerance test of a vertical angle of the wall at an impact location along the wall is performed to determine that a steepness of the wall is within a predefined range at 304. In response to determining that the steepness of the wall is within the predefined range, the system offsets a starting location of the player avatar downward and offsets the impact location downward to conduct a second collision check to determine that a height of the wall at the impact location exceeds a minimum height at 705. In response to determining that the height of the wall exceeds the minimum height, the system conducts a third collision test starting from an elevated point above the impact location and moving downward to identify a top of a ledge corresponding to the impact location at 706. When the top of the ledge has been identified, a normal of the top of the ledge is calculated to determine whether an angle of the ledge is within a predefined range of acceptable angles to support latching, at 707. If the angle of the ledge is within the predefined range of acceptable angles, the system generates an anchor point for attaching the avatar to the wall at the top of the ledge at 708.

Figure 8:
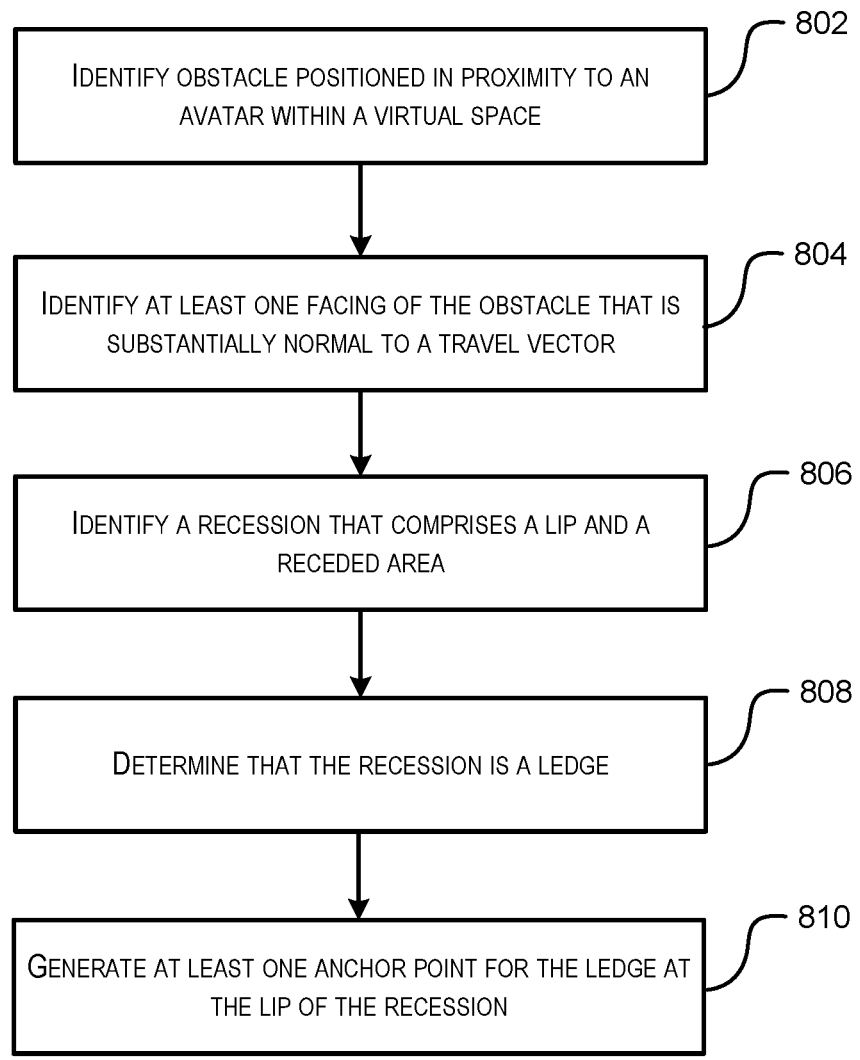
FIG. 8 depicts a flow diagram showing an example process flow for dynamically facilitating interaction between an avatar and a ledge in accordance with embodiments.

FIG. 8 depicts a flow diagram showing an example process flow 800 for dynamically facilitating interaction between an avatar and a ledge in accordance with embodiments. The process 800 may be performed by a computing device that is configured to generate activation data based on user input. For example, the process 800 may be performed by a controller capable of facilitating interaction between the user and a software application, such as the controller 302 described with respect to FIG. 3 above. In some embodiments, such a software application is a video game played by the user.

At 802, the process 800 comprises identifying at least one obstacle positioned in proximity to an avatar within a virtual space. In some embodiments, the avatar is an object (e.g., a character) that is being controlled by a user of the user device. In embodiments, a collision check is performed on all obstacles in a vicinity (e.g., within a predetermined distance) of the avatar to identify the at least one obstacle. In some embodiments, the virtual space comprises a virtual map implemented in a video game, such as a user-generated game map. In some embodiments, obstacle is an edge from which the avatar may fall, the at least one facing on the obstacle comprising a facing along the edge.

At 804, the process 800 comprises identifying at least one facing on the obstacle that is substantially normal to a vector of travel associated with the avatar. In some embodiments, the vector of travel is associated with a current trajectory of the avatar. In some embodiments, the vector of travel is associated with an input vector generated from information received from a user. The at least one facing may be determined to be substantially normal to the vector of travel if an angle between the at least one facing and the vector of travel falls within a predetermined range of values.

At 806, the process 800 comprises identifying, on the at least one facing, a recession that comprises a lip and a receded area above the lip. In some embodiments, the recession is identified on the at least one facing by virtue of being within a height range. In at least some of these embodiments, the height range comprises a vertical minimum height and a vertical maximum height.

In some embodiments, the process 800 further comprises determining a height of the recession, wherein the recession is determined to be a ledge if the height is greater than a threshold height. In such embodiments, the threshold height may be determined based on a height value associated with the avatar.

At 808, the process 800 comprises determining, based at least in part on one or more properties of the receded area, that the recession is a ledge. In some embodiments, the one or more properties of the receded area comprise at least an angle of the receded area in relation to the at least one facing.

At 810, the process 800 comprises generating, at the lip, an anchor point configured to enable one or more interactions between the avatar and the recession. In some embodiments, the process 800 further comprises classifying the recession based at least in part on one or more additional properties of the receded area. In these embodiments, the one or more interactions between the avatar and the recession may vary based on the classification of the recession.

The methods described herein are directed to virtual controllers, i.e., controllers that use a touchscreen or touchscreen-like functionality to provide for readily customized controller button layouts. According to some embodiments, the touchscreen is at least a portion of a physical, handheld controller that interfaces with a gaming device like a gaming console, personal computer, tablet, smartphone, thin client device (e.g., USB or HDMI device plugged in to a screen). According to some embodiments, the touchscreen is the predominant feature of the controller, which interfaces with a gaming device like a gaming console, personal computer, tablet, smartphone, thin client device (e.g., USB or HDMI device plugged in to a screen). According to some embodiments, the controller is made up of a mobile device or tablet in conjunction with enabling software that connects the mobile device or tablet to a gaming device like a gaming console, personal computer, thin client device (e.g., USB or HDMI device plugged in to a screen) or other suitable gaming device. According to some further embodiments, the touchscreen is a touch-enabled screen of a gaming device like a gaming console, personal computer, tablet, or smartphone.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as being essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following, further examples are described to facilitate understanding of aspects of the invention:

Example A. A method comprising: while an avatar within a virtual space transits the virtual space under the control of a user, identifying at least one obstacle positioned in proximity to the avatar in response to detecting that the avatar is within a threshold distance of the at least one obstacle;

identifying at least one facing on the obstacle that is substantially normal to a vector of travel associated with the avatar;

identifying, on the at least one facing, a recession that comprises a lip and a receded area above the lip;

determining, based at least in part on one or more properties of the receded area, that the recession is a ledge; and generating, at the lip, an anchor point configured to enable one or more interactions between the avatar and the recession.

Example B. The method of example A or any of the preceding or subsequent examples, wherein the at least one facing is substantially normal to the vector of travel if an angle between the at least one facing and the vector of travel falls within a predetermined range of values.

Example C. The method of example A or any of the preceding or subsequent examples, wherein the vector of travel is associated with a current trajectory of the avatar.

Example D. The example A or any of the preceding or subsequent examples, further comprising: detecting that the current trajectory of the avatar will cause the avatar to leave a playable area of the virtual space, and causing the avatar to interact with the anchor point in response to the detecting.

Example E. The example A or any of the preceding or subsequent examples, wherein the vector of travel is associated with an input vector generated from information received from the user.

Example F. The example A or any of the preceding or subsequent examples, wherein the obstacle comprises an edge from which the avatar may fall, the at least one facing on the obstacle comprising a facing along the edge.

Example G. The example A or any of the preceding or subsequent examples, wherein the one or more properties of the receded area comprise at least an angle of the receded area in relation to the at least one facing.

Example H. The example A or any of the preceding or subsequent examples, further comprising determining a height of the recession, wherein the recession is determined to be a ledge if the height is greater than a threshold height.

Example I. The example H or any of the preceding or subsequent examples, wherein the threshold height is based on a height value associated with the avatar.

Example J. A user device comprising: a processor; and a memory including instructions that, when executed with the processor, cause the user device to, at least: while an avatar under the control of a user transits a virtual space, identify at least one obstacle, in response to detecting that the avatar is within a threshold distance of the at least one obstacle;
identify at least one facing on the obstacle that is substantially normal to a vector of travel associated with the avatar;
identify, on the at least one facing, a recession that comprises a lip and a receded area above the lip;
determine, based at least in part on one or more properties of the receded area, that the recession is a ledge; and
generate, at the lip, an anchor point configured to enable one or more interactions between the avatar and the recession.

Example K. The example J or any of the preceding or subsequent examples, wherein instructions further cause the user device to classify the recession based at least in part on one or more additional properties of the receded area.

Example L. The example J or any of the preceding or subsequent examples, wherein the one or more interactions vary based on the classification of the recession.

Example M. The example J or any of the preceding or subsequent examples, wherein the recession is identified on the at least one facing by virtue of being within a height range.

Example N. The example M or any of the preceding or subsequent examples, wherein the height range comprises a vertical minimum height and a vertical maximum height.

Example O. The example J or any of the preceding or subsequent examples, wherein the avatar comprises an object being controlled by a user of the user device.

Example P. The example J or any of the preceding or subsequent examples, wherein a collision check is performed on all obstacles in a vicinity of the avatar to identify the at least one obstacle.

Example Q. The example J or any of the preceding or subsequent examples, wherein the instructions comprise a video game executed on the user device.

Example R. A non-transitory computer-readable media collectively storing computer-executable instructions that upon execution cause one or more computing devices to collectively perform acts comprising:
while an avatar within a virtual space transits the virtual space under the control of a user, identifying at least one obstacle positioned in proximity to the avatar in response to detecting that the avatar is within a threshold distance of the at least one obstacle;
identifying at least one facing on the obstacle that is substantially normal to a vector of travel associated with the avatar;
identifying, on the at least one facing, a recession that comprises a lip and a receded area above the lip;
determining, based at least in part on one or more properties of the receded area, that the recession is a ledge; and
generating, at the lip, an anchor point configured to enable one or more interactions between the avatar and the recession.

Example S. The example R or any of the preceding or subsequent examples, wherein the at least one facing is substantially normal to the vector of travel if an angle between the at least one facing and the vector of travel falls within a predetermined range of values and the vector of travel is associated with a current trajectory of the avatar or an input vector generated from information received from a user.

Example T. The example S or any of the preceding or subsequent examples, wherein the recession is identified on the at least one facing by scanning the at least one facing from top to bottom.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:
1. A method comprising:
streaming video content from a server to a client device associated with at least one controller and at least one display device over a communication network, wherein the at least one display device presents a display of a virtual space in accordance with the video content; and
executing instructions stored in memory of the server, wherein a processor of the server executes the instructions to:

identify at least one obstacle positioned in proximity to an avatar within the virtual space in response to detecting that the avatar is within a threshold distance of the at least one obstacle as the avatar travels within the virtual space in accordance with input at the at least one controller of the client device;

identify at least one facing on the obstacle that is normal to a vector of travel associated with the avatar;

identify, on the at least one facing, a recession that comprises a lip and a receded area above the lip;

determine, based at least in part on one or more properties of the receded area, that the recession is a ledge; and generate, at the lip, an anchor point configured to enable one or more interactions between the avatar and the recession, wherein the interactions enabled by the anchor point are displayed within the display of the virtual space by the display device.

2. The method of claim 1, wherein the at least one facing is normal to the vector of travel if an angle between the at least one facing and the vector of travel falls within a predetermined range of values.

3. The method of claim 2, wherein the vector of travel is associated with a current trajectory of the avatar.

4. The method of claim 3, further comprising detecting that the current trajectory of the avatar will cause the avatar to leave a playable area of the virtual space, and causing the avatar to interact with the anchor point in response to the detected trajectory.

5. The method of claim 2, wherein the vector of travel is associated with an input vector generated from information received from the client device.

6. The method of claim 1, wherein the obstacle comprises an edge from which the avatar may fall, the at least one facing on the obstacle comprising a facing along the edge.

7. The method of claim 1, wherein the one or more properties of the receded area comprise at least an angle of the receded area in relation to the at least one facing.

8. The method of claim 1, further comprising determining a height of the recession, wherein the recession is determined to be the ledge if the height is greater than a threshold height.

9. The method of claim 8, wherein the threshold height is based on a height value associated with the avatar.

10. A system comprising:
a processor of a server; and
a memory including instructions executable by the processor:
stream video content to a client device associated with at least one controller and at least one display device over a communication network, wherein the at least one display device presents a display of a virtual space in accordance with the video content;
identify at least one obstacle, in response to detecting that an avatar within the virtual space is within a threshold distance of the at least one obstacle as the avatar travels within the virtual space in accordance with input at the at least one controller of the client device;
identify at least one facing on the obstacle that is normal to a vector of travel associated with the avatar;
identify, on the at least one facing, a recession that comprises a lip and a receded area above the lip;
determine, based at least in part on one or more properties of the receded area, that the recession is a ledge; and
generate, at the lip, an anchor point configured to enable one or more interactions between the avatar and the recession, wherein the interactions enabled by the anchor point are displayed within the display of the virtual space by the display device.

11. The system of claim 10, wherein the processor executes further instructions to classify the recession based at least in part on one or more additional properties of the receded area.

12. The system of claim 11, wherein the one or more interactions vary based on the classification of the recession.

13. The system of claim 10, wherein the recession is identified on the at least one facing by virtue of being within a height range.

14. The system of claim 13, wherein the height range comprises a vertical minimum height and a vertical maximum height.

15. The system of claim 10, wherein the avatar comprises an object being controlled by a user of the client device.

16. The system of claim 10, wherein a collision check is performed on all obstacles in a vicinity of the avatar to identify the at least one obstacle.

17. The system of claim 10, wherein the instructions comprise a video game executed on the client device.

18. A non-transitory computer-readable storage media storing computer-executable instructions that upon execution cause one or more computing devices to collectively perform acts comprising:
streaming video content from a server to a client device associated with at least one controller and at least one display device over a communication network, wherein the at least one display device presents a display of a virtual space in accordance with the video content;
identifying at least one obstacle positioned in proximity to an avatar within the virtual space in response to detecting that the avatar is within a threshold distance of the at least one obstacle as the avatar travels within the virtual space in accordance with input at the at least one controller of the client device;
identifying at least one facing on the obstacle that is normal to a vector of travel associated with the avatar;
identifying, on the at least one facing, a recession that comprises a lip and a receded area above the lip;
determining, based at least in part on one or more properties of the receded area, that the recession is a ledge; and
generating, at the lip, an anchor point configured to enable one or more interactions between the avatar and the recession, wherein the interactions enabled by the anchor point are displayed within the display of the virtual space by the display device.

19. The non-transitory computer-readable storage media of claim 18, wherein the at least one facing is normal to the vector of travel if an angle between the at least one facing and the vector of travel falls within a predetermined range of values, and the vector of travel is associated with a current trajectory of the avatar or an input vector generated from information received from the client device.

20. The non-transitory computer-readable storage media of claim 18, wherein the recession is identified on the at least one facing by scanning the at least one facing from top to bottom.

* * * * *